J. W. HAINES.
SILVERING GLASS PITCHERS.
No. 47,101.        Patented Apr. 4, 1865.
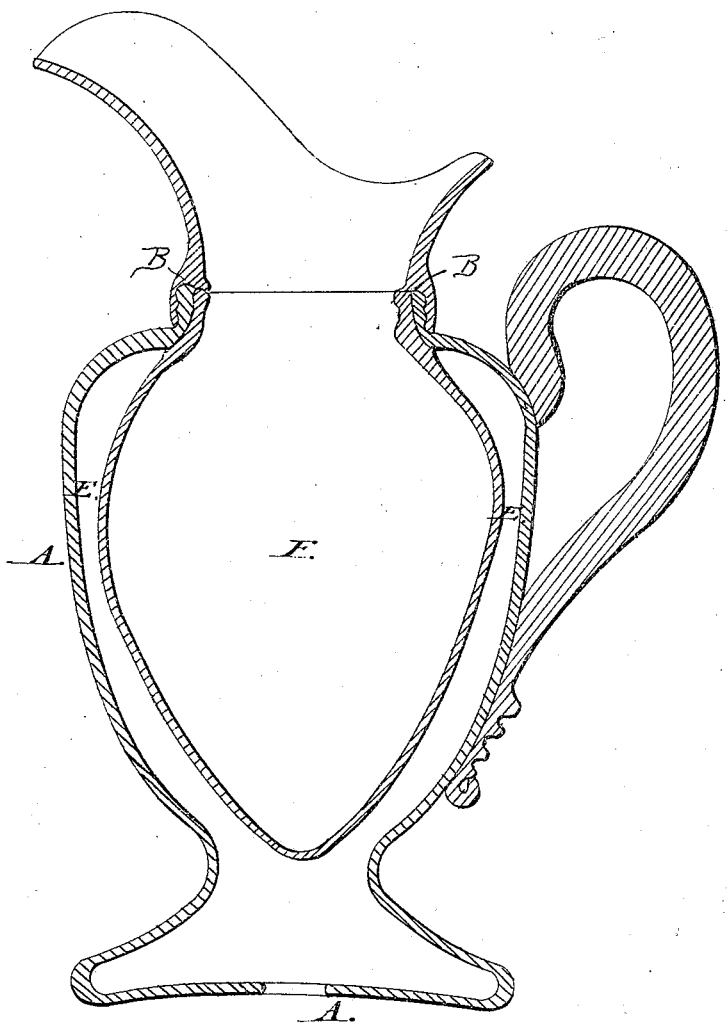
WITNESSES:
INVENTOR:

UNITED STATES PATENT OFFICE.

JOHN W. HAINES, OF SOMERVILLE, MASSACHUSETTS.

IMPROVEMENT IN SILVERING GLASS PITCHERS.

Specification forming part of Letters Patent No. 47,101, dated April 4, 1865.

*To all whom it may concern:*

Be it known that I, JOHN W. HAINES, of Somerville, in the county of Middlesex, in the State of Massachusetts, have invented a new mode of manufacturing a double glass pitcher with metallic cap for silvering; and I do hereby declare that the following is a full and exact description thereof, reference being had to the accompanying drawing, and to the letters of reference marked therein.

The nature of my invention consists in, after having blown the outside of the glass pitcher (marked A) I drop a solid hot glass on the outside rim, (marked B,) thence expanding it into oval shape by means of suction, produced with the mouth, thus forming two copartments, the inside (marked E) for silvering, the inner side (marked F) for holding domestic liquids.

What I claim as my invention, and desire to secure by Letters Patent, is—

The dropping on of the hot glass on the outside rim of the pitcher, and by means of suction with the mouth, expanding the solid piece of hot glass into oval shape, producing two copartments, as above described.

JOHN W. HAINES.

In presence of—
LUTHER BRIGGS,
HERBERT T. WHITMAN.